(12) United States Patent
Kreidenko

(10) Patent No.: US 9,742,674 B1
(45) Date of Patent: Aug. 22, 2017

(54) METHODS FOR DISTRIBUTED APPLICATION VISIBILITY AND REPORTING AND DEVICES THEREOF

(71) Applicant: F5 Networks, Inc., Seattle, WA (US)

(72) Inventor: Valery Kreidenko, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/967,998

(22) Filed: Aug. 15, 2013

Related U.S. Application Data

(60) Provisional application No. 61/683,481, filed on Aug. 15, 2012.

(51) Int. Cl.
*H04L 12/26* (2006.01)
*H04L 12/801* (2013.01)
*H04W 28/10* (2009.01)
*H04W 28/08* (2009.01)

(52) U.S. Cl.
CPC .............. *H04L 47/11* (2013.01); *H04L 43/00* (2013.01); *H04W 28/08* (2013.01); *H04W 28/10* (2013.01)

(58) Field of Classification Search
None
See application file for complete search history.

(56) References Cited

U.S. PATENT DOCUMENTS

| 7,650,331 B1 | 1/2010 | Dean et al. | |
| 2004/0210898 A1* | 10/2004 | Bergen et al. | 718/100 |
| 2006/0089985 A1* | 4/2006 | Poletto | 709/224 |
| 2011/0258137 A1* | 10/2011 | Pasta | 705/347 |
| 2012/0166430 A1* | 6/2012 | Bakalov | 707/723 |
| 2013/0047027 A1* | 2/2013 | Hatasaki et al. | 714/4.11 |
| 2013/0347125 A1* | 12/2013 | Rezlan | H04L 63/107 726/27 |
| 2014/0173127 A1* | 6/2014 | Samuels et al. | 709/234 |

OTHER PUBLICATIONS

Map Reduce Links, retrieved at http://www.dbms2.com/2008/08/25/mapreduce-links/ (Aug. 25, 2008).
Dean et al., "MapReduce: Simplified Data Processing on Large Clusters," pp. 1-13 (2004).

* cited by examiner

*Primary Examiner* — Edan Orgad
*Assistant Examiner* — Rebecca Song
(74) *Attorney, Agent, or Firm* — LeClairRyan, a Professional Corporation

(57) ABSTRACT

A method, non-transitory computer readable medium, and multi-blade network traffic management apparatus that obtains, with a primary blade and one or more secondary blades, statistical data regarding network traffic respectively managed by each of the blades. The statistical data respectively obtained by each of the blades is stored by each of the blades in a respective database associated with each of the blades. A request for statistical data is received with the primary blade. Each of the databases is queried with the primary blade to retrieve at least a subset of the statistical data stored therein in response to the obtained request. The retrieved at least a subset of the statistical data is consolidated with the primary blade to generate a response to the received request.

21 Claims, 3 Drawing Sheets

METHODS FOR DISTRIBUTED APPLICATION VISIBILITY AND REPORTING AND DEVICES THEREOF

CROSS-REFERENCE TO RELATED APPLICATIONS

This application claims the benefit of U.S. Provisional Patent Application Ser. No. 61/683,481, filed Aug. 15, 2012, which is hereby incorporated by reference in its entirety.

FIELD

This technology generally relates to network traffic management apparatuses and, more particularly, to methods for distributed application visibility and statistical reporting and devices thereof.

BACKGROUND

Network administrators often analyze the performance of a network, including devices and web applications within the network. Some networks include a network traffic management apparatus configured to optimize or accelerate network traffic or to perform load balancing across a pool of server computing devices, for example. As the network traffic management apparatus manages the traffic of the network, it can be uniquely positioned to monitor and store statistical data and provide detailed metrics regarding the network traffic and/or networked devices. A network traffic management apparatus may be configured with an application visibility and reporting (AVR) module configured to communicate with a database and provide such functionality.

However, analyzing a network is difficult in network traffic management apparatus deployments taking advantage of parallel processing and including a plurality of blades, each of which is configured with an AVR module having an associated database. In order to respond to queries for statistical data, some multi-blade deployments can use a map-reduce or map-reduce-merge algorithm in the database layer to consolidate data. However, such algorithms may be ineffective when one or more databases associated with an AVR module of a blade is a legacy database, a different version than another database, manufactured by a different vendor than another database, and/or does not support the same consolidation algorithm as another database.

SUMMARY

A method for distributed application visibility and reporting includes obtaining, with a primary blade and one or more secondary blades of a multi-blade network traffic management apparatus, statistical data regarding network traffic respectively managed by each of the blades. The statistical data respectively obtained by each of the blades is stored by each of the blades in a respective database associated with each of the blades. A request for statistical data is received with the primary blade. Each of the databases is queried by the primary blade to retrieve at least a subset of the statistical data stored therein in response to the obtained request. The retrieved at least a subset of the statistical data is consolidated with the primary blade to generate a response to the received request.

A non-transitory computer readable medium having stored thereon instructions for distributed application visibility and reporting comprising machine executable code which when executed a processor, causes the processor to perform steps including obtaining, with a primary blade and one or more secondary blades, statistical data regarding network traffic respectively managed by each of the blades. The statistical data respectively obtained by each of the blades is stored by each of the blades in a respective database associated with each of the blades. A request for statistical data is received with the primary blade. Each of the databases is queried with the primary blade to retrieve at least a subset of the statistical data stored therein in response to the obtained request. The retrieved at least a subset of the statistical data is consolidated with the primary blade to generate a response to the received request.

A multi-blade network traffic management apparatus includes a primary blade and one or more secondary blades each comprising at least one of configurable hardware logic configured to implement or a processor coupled to a memory and configured to execute programmed instructions stored in the memory including obtaining statistical data regarding managed network traffic and storing the obtained statistical data in a respective database. The configurable hardware logic of the primary blade is further configured to implement or the processor of the primary blade is further configured to execute programmed instructions stored in the memory of the primary blade further comprising receiving a request for statistical data. Each of the databases is queried to retrieve at least a subset of the data stored therein in response to the obtained request. The retrieved at least a subset of the statistical data is consolidated to generate a response to the received request.

This technology provides a number of advantages including methods, non-transitory computer readable medium, and network traffic management apparatus that facilitate distributed statistical reporting of network traffic with web applications hosted by server computing devices. With this technology, requests for statistical data can be serviced efficiently in a distributed or multi-blade network traffic management apparatus irrespective of the version or capabilities of the databases utilized by the AVR module of the various blades. Advantageously, a primary blade performs retrieval and consolidation of statistical data in response to queries in the application layer and without requiring implementation of map-reduce or map-reduce-merge algorithms, which are not supported by all database.

DETAILED DESCRIPTION

Figure 1:
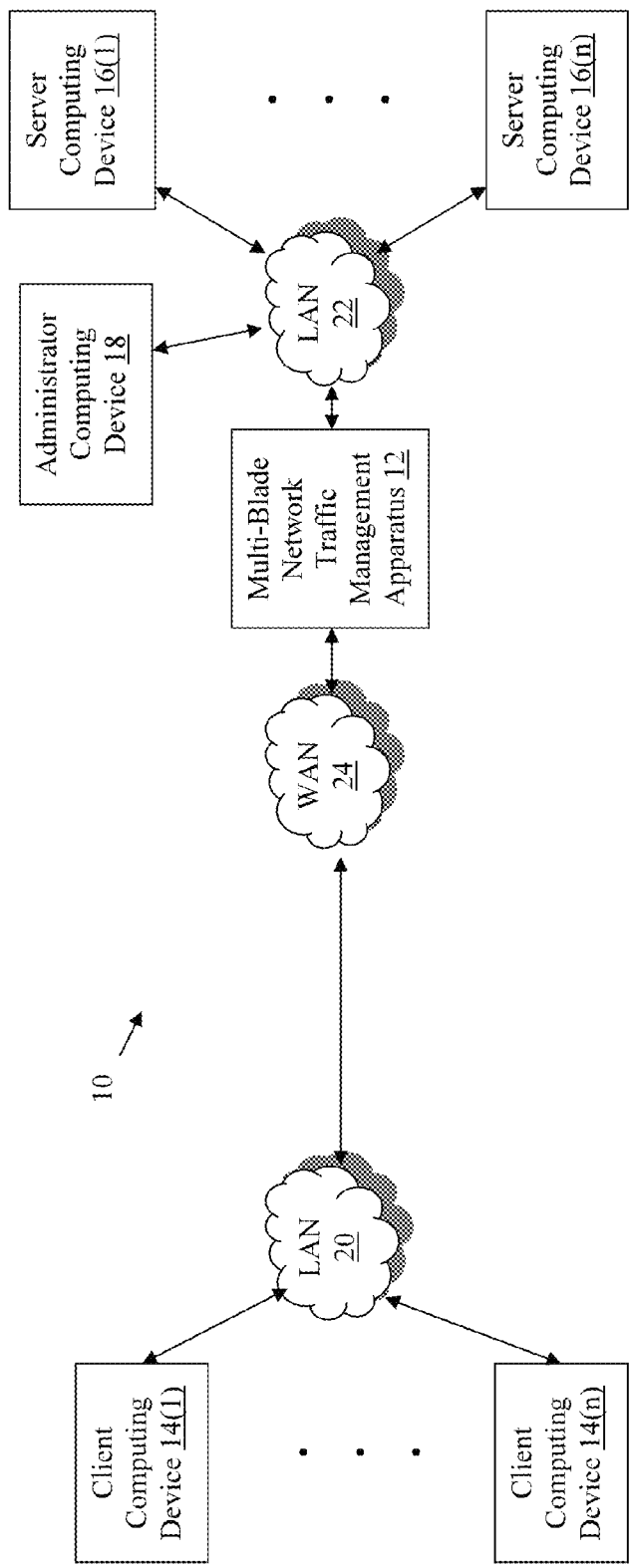
FIG. 1 is a block diagram of a network environment which incorporates an exemplary multi-blade network traffic management apparatus.

An exemplary network environment 10 with a multi-blade network traffic management apparatus 12, client computing devices 14(1)-14(n), server computing devices 16(1)-16(n), and an administrator computing device 18 is illustrated in FIG. 1. In this example, the multi-blade network traffic management apparatus 12, client computing devices 14(1)-14(n), server computing devices 16(1)-16(n), and administrator computing device 18 are coupled together by local area networks (LANs) 20 and 22 and wide area network (WAN) 24, although other types and numbers of systems, devices, components and other elements in other configurations which are coupled together in other manners can be used. This technology provides a number of advantages including methods, non-transitory computer readable medium, and apparatus that facilitate distributed application visibility and reporting of statistical data associated with web application network traffic.

Figure 2:
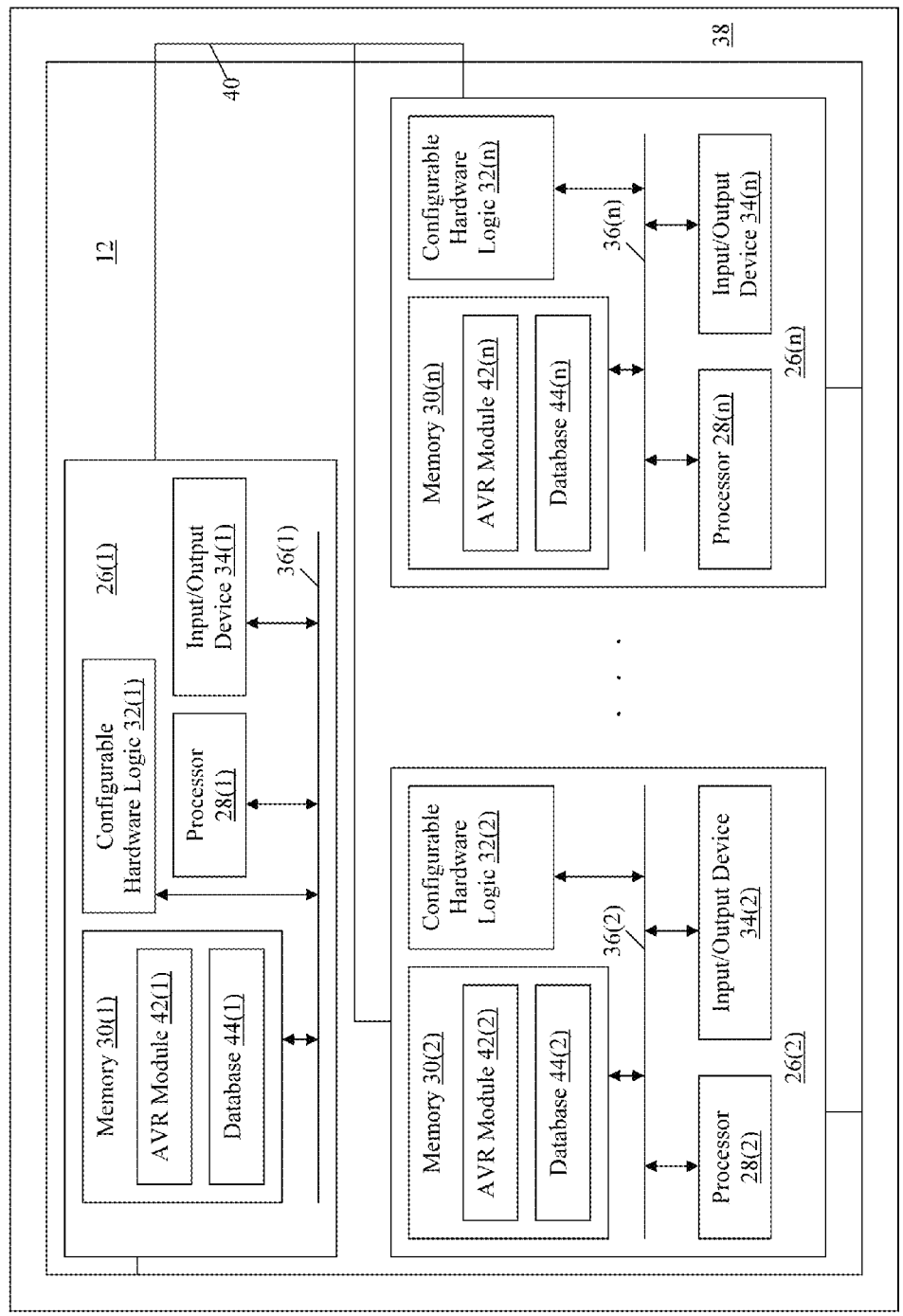
FIG. 2 is a block diagram of the exemplary multi-blade network traffic management apparatus.

Referring more specifically to FIGS. 1 and 2, the multi-blade network traffic management apparatus 12 is coupled to the client computing devices 14(1)-14(n) by the LAN 20 and WAN 22. In this example, the multi-blade network traffic management apparatus 12 is further coupled to the server computing devices 16(1)-16(n) and the administrator computing device 18 by the LAN 22. Other network devices configured to generate, send, and receive network communications and coupled together via other topologies can also be used. While not shown, the environment 10 also may include additional network components, such as routers, switches and other devices, which are well known to those of ordinary skill in the art and thus will not be described here.

The multi-blade network traffic management apparatus 12 may perform any number of functions, such as monitoring, optimizing, securing, and accelerating the network traffic between the client computing devices 14(1)-14(n) and the server computing devices 16(1)-16(n). In this example, the multi-blade network traffic management apparatus 12 includes a primary blade 26(1) and a plurality of secondary blades 26(2)-26(n). Each blade 26(1)-26(n) multi-blade network traffic management apparatus 12 includes at least one processor 28(1)-28(n), memory 30(1)-30(n), optional configurable hardware logic 32(1)-(n), and an input/output device 34(1)-34(n), which are coupled together by a bus 36(1)-36(n), although the network traffic management apparatus 12 may include other types and numbers of elements in other configurations. In this example, each bus 36(1)-36(n) is a hyper-transport bus, although other bus types and links may be used, such as PCI. Each of the blades 26(1)-26(n) in this example is attached to a chassis 38 of the multi-blade network traffic management apparatus 12. Additionally, the blades can communicate using a communication channel 40 disposed between the blades and optionally integral with the chassis.

The processors 28(1)-28(n) of each of the blades 26(1)-26(n) of the multi-blade network traffic management apparatus 12 may execute one or more computer-executable instructions for the any number of the functions identified herein. The processors 28(1)-28(n) of each of the blades 26(1)-26(n) may comprise one or more central processing units or general purpose processors with one or more processing cores, such as AMD® processor(s), although other types of processor(s) could be used (e.g., Intel®).

The memory 30(1)-30(n) of each of the blades 26(1)-26(n) of the multi-blade network traffic management apparatus 12 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 28(1)-28(n), can be used for the memory 30(1)-30(n).

In this example, the memory 30(1)-30(n) of each of the blades 26(1)-26(n) of the multi-blade network traffic management apparatus 12 includes an application visibility and reporting (AVR) module 42(1)-42(n) configured to store instructions for one or more aspects of the technology as described and illustrated herein, although the AVR functions can be performed based on instructions stored elsewhere and/or spanning multiple types of data storage devices. The 30(1)-30(n) of each of the blades 26(1)-26(n) further includes at least one database 38 for storing statistical data obtained by the AVR module 42(1)-42(n), although the statistical data can be stored elsewhere in one or more data warehouses spanning multiple types of data storage devices, for example.

The optional configurable hardware logic 32(1)-32(n) of each of the blades 26(1)-26(n) of the multi-blade network traffic management apparatus 12 may comprise specialized hardware configured to be capable of implementing one or more steps of this technology as illustrated and described with reference to the examples herein. By way of example only, the optional configurable logic 32(1)-32(n) may comprise one or more of field programmable gate arrays (FPGAs), field programmable logic devices (FPLDs), application specific integrated circuits (ASICs) and/or programmable logic units (PLUs).

The input/output device 34(1)-34(n) of each of the blades 26(1)-26(n) of the network traffic management apparatus 12 operatively couples and communicates between the network traffic management apparatus 12, the client computing devices 14(1)-14(n), the server computing devices 16(1)-16(n), and the administrator computing device 18, which are all coupled together by the LANs 20 and 22 and WAN 24, although other types and numbers of communication networks or systems with other types and numbers of connections and configurations to other devices and elements can also be used. By way of example only, the LANs 20 and 22 and WAN 24 can use TCP/IP over Ethernet and industry-standard protocols, including NFS, CIFS, SOAP, XML, LDAP, and SNMP, although other types and numbers of communication networks, can be used.

The LANs 20 and 22 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN 24 may comprise any wide area network (e.g., Internet), although any other type of traffic network topology may be used.

Each of the client computing devices 14(1)-14(n) and server computing devices 16(1)-16(n) includes a processor, a memory, and an input/output device, which are coupled together by a bus or other link, although other numbers and types of network devices could be used. The client computing devices 14(1)-14(n) may run interface application(s), such as a Web browser, that may provide an interface to make requests for and receive content and/or communicate with web applications stored on one or more of the server computing devices 16(1)-16(n) via the LANs 20 and 22 and/or WAN 24.

Generally, the server computing devices 16(1)-16(n) process requests received from requesting client computing devices 14(1)-14(n) via the LANs 20 and 22 and/or WAN 24 according to the HTTP-based application RFC protocol or the CIFS or NFS protocol for example. Various network processing applications, such as CIFS applications, NFS applications, HTTP Web Server applications, and/or FTP applications, may be operating on the server computing devices 16(1)-16(n) and transmitting content (e.g., files, Web pages) to the client computing devices 14(1)-14(n) in response to requests for the content from the client computing devices 14(1)-14(n).

The server computing devices 16(1)-16(n) may provide data or receive data in response to requests directed toward applications on the server computing devices 16(1)-16(n) from the client computing devices 14(1)-14(n). The server computing devices 16(1)-16(n) may be hardware or software or may represent a system with multiple server computing devices 16(1)-16(n) in a server pool, which may include internal or external networks. In this example the server computing devices 16(1)-16(n) may be any version of Microsoft® IIS servers or Apache® servers, although other types of server computing devices 16(1)-16(n) may be used. Further, additional server computing devices 16(1)-16(n) may be coupled to one of the LANs 18 and 20 and many different types of applications may be available on each of the server computing devices 16(1)-16(n).

The administrator computing device 18 includes a processor, a memory, an input/output device, a display device, such as a computer monitor, and an input device, such as a keyboard or pointing device, which are coupled together by a bus or other link, although other numbers and types of network devices could be used. In this example, a user of the administrator computing device 18 can communicate with the multi-blade network traffic management apparatus 12 over the LAN 22 to configure the multi-blade network traffic management apparatus 12 or retrieve statistical data using one of the AVR modules 42(1)-42n) of the multi-blade network traffic management apparatus 12, as described and illustrated in detail below. In other examples, the administrator computing device 18 can be located elsewhere, such as connected to LAN 20, for example.

Although an exemplary network environment 10 with the multi-blade network traffic management apparatus 12, client computing devices 14(1)-14(n), server computing devices 16(1)-16(n), administrator computing device 18, LANs 20 and 22 and WAN 24 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
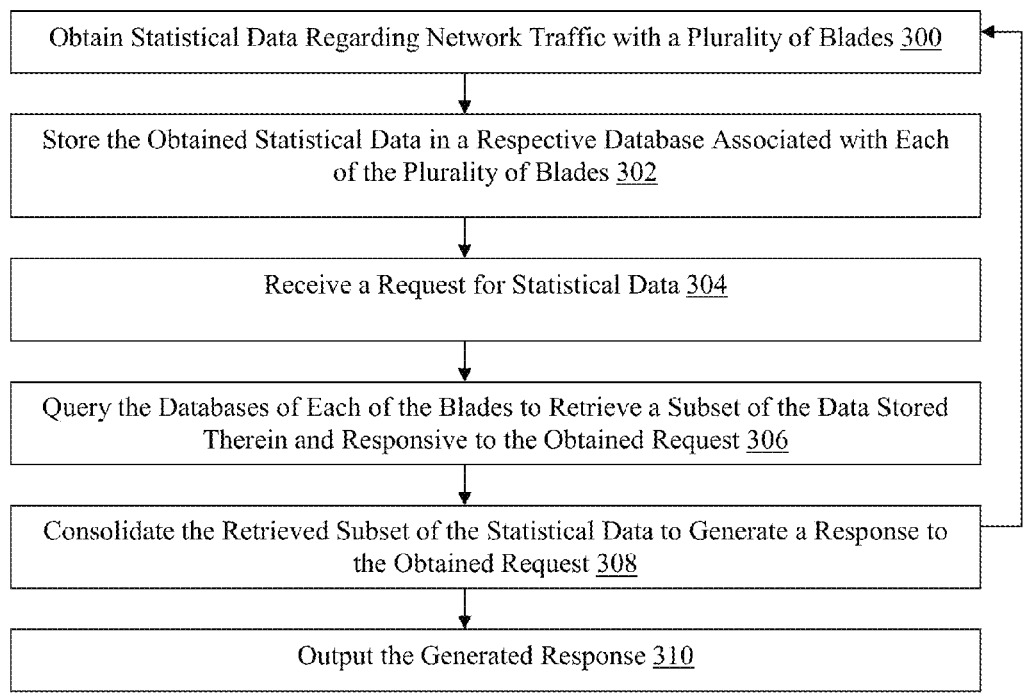
FIG. 3 is a flowchart of an exemplary method for distributed application visibility and reporting.

An exemplary method for distributed application visibility and reporting will now be described with reference to FIGS. 1-3. In this example, in step 300, the blades 26(1)-26(n) of the multi-blade network traffic management apparatus 12 each implement a respective application and visibility reporting (AVR) module 42(1)-42(n) to obtain statistical data regarding network traffic respectively managed by each of the blades 26(1)-26(n). Accordingly, each blade 26(1)-26(n) of the multi-blade network traffic management apparatus 12 implements a respective AVR module 42(1)-42(n) to obtain statistical data based on the network traffic that is processed by the blade 26(1)-26(n).

The network traffic can be requests sent from the client computing devices 14(1)-14(n) for content and/or services hosted by the server computing devices 16(1)-16(n) and responses sent by the server computing devices 16(1)-16(n) to the requests. For example, network traffic associated with interactions by users of the client computing device 14(1)-14(n) with web applications hosted by the server computing devices 16(1)-16(n) can be monitored by each blade 26(1)-26(n) of the multi-blade network traffic management apparatus 12.

The statistical data can include a number or type of transactions associated with one or more response codes, user agents, hypertext transfer protocol (HTTP) methods, countries, or internet protocol (IP) addresses, for example. The data can further include server computing device latency, client computing device latency, request throughput, response throughput, or a number of sessions facilitated by the respective one of the blades 26(1)-26(n) of the multi-blade network traffic management apparatus 12, although other numbers and types of performance metrics can also be used. Additionally, the data can be obtained for one or more entities such as uniform resource locators (URLs), virtual servers operating on one or more of the server computing devices 16(1)-16(n), server computing devices 16(1)-16(n), or web applications hosted by the server computing devices 16(1)-16(n), for example, although data can also be obtained for other entities.

In one example, the statistical data is obtained by each blade 26(1)-26(n) of the multi-blade network traffic management apparatus 12 according to an analytics profile associated with each AVR module 42(1)-42(n) and established by an administrator of the multi-blade network traffic management apparatus 12. Accordingly, a network administrator using the administrator computing device 18 can communicate with each AVR module 42(1)-42(n) through the LAN 22, for example, to establish a profile defining the parameters of the data acquisition including the types of obtained data and the entities for which the data is to be obtained. The analytics profiles can be stored by each of the blades 26(1)-26(n) in a respective memory 30(1)-30(n).

Optionally, the analytics profile is the same for each blade 26(1)-26(n) of the multi-blade network traffic management apparatus 12, although the analytics profiles can also be different. Also optionally, each AVR module 42(1)-42(n) can further facilitate notifications when obtained statistical data satisfies a threshold condition, as well as output of a portion of the statistical data through one or more graphical displays, for example, according to the analytics profile.

In step 302, the blades 26(1)-26(n) of the multi-blade network traffic management apparatus 12 each implement the respective AVR module 42(1)-42(n) to store the obtained statistical data in a respective one of the databases 44(1)-44(n). The data can be stored in the databases 44(1)-44(n) according to sets of tables associated with an entity type, for example, although other storage arrangements can also be used. In this example, each table of a table set is configured to store data for a different trailing or historical time period, such as two hours, one day, one week, one month, and one year, although any size and number of trailing time periods can also be used. Optionally, the tables can further be configured to store the statistical data based on a level of granularity corresponding to the associated trailing time period.

In step 304, the multi-blade network traffic management apparatus 12 receives a request for statistical data and forwards the request to the primary blade 26(1). In this example, the primary blade 26(1) and secondary blades 26(2)-26(n) can be designated as such by the network administrator using the administrator computing device 18 or by a manufacturer of the multi-blade network traffic management apparatus, for example.

The network administrator using the administrator computing device 18 can interact with a graphical interface generated by one or more of the AVR modules 42(1)-42(n) to submit the request using the LAN 22, although the request can be submitted in other ways. The graphical interface can be configured to receive the request from the network administrator and to send the request to the primary blade 26(1). The request can identify at least one entity (e.g., one of the server computing devices 16(1)-16(n)) or entity type (e.g., URLs) and a time interval (e.g., from two hours ago to the current time). In one example, the network administrator can submit a request using the administrator computing device 18 for the top ten URLs accessed by the client computing devices 14(1)-14(n) over the last two hours. Any other entities, entity types, time intervals, or requests identifying other types of statistical data can also be used.

In step 306, the primary blade 26(1) of the multi-blade network traffic management apparatus 12 implementing the associated AVR module 42(1) queries the databases 44(1)-44(n) of each of the blades 26(1)-26(n) to retrieve at least a subset of the data stored therein. Accordingly, in the application layer in which the AVR module 42(1) is executed, the primary blade 26(1) automatically generates one or more queries based on the request received in step 304 and submits the queries to its associated database 44(1) as well as the databases 44(2)-44(n) associated with each of the secondary blades 26(2)-26(n). In this example, the primary blade 26(1) implementing its associated AVR module 42(1) communicates with the databases 44(2)-44(n) of the secondary blades 26(2)-26(n) using the communication channel 40.

In this example, the primary blade 26(1) implementing the associated AVR module 42(1) retrieves identification information of the plurality of secondary blades 26(2)-36(n) from a secondary blades list stored by the primary blade 26(1), such as in the memory 30(1), for example. The secondary blades list can be populated by the primary blade 26(1) through a discovery process or can be established by an administrator using the administrator computing device 18 or by a manufacturer of the multi-blade network traffic management apparatus 12. The primary blade 26(1) implementing the AVR module 42(1) can direct the queries in step 306 using the communication channel 40 according to the identification information for each of the secondary blades 26(2)-26(n).

In one example, the request received in step 304 identifies URLs accessed by the client computing devices 14(1)-14(n) as the type of statistical data and a time interval of from two hours ago to the current time. In this example, the primary blade 26(1) implementing the associated AVR module 42(1) queries each database 44(1)-44(n) associated with each secondary blade 26(2)-26(n) in step 306. The subset of statistical data returned by each of the queries is retrieved from at least one table of each of the databases 44(1)-44(2) included in a table set storing data for the URL type of statistical data and associated with a trailing time period that includes the entire identified time interval. Thereby, the subset of statistical data is retrieved from table(s) in each database 44(1)-44(n) corresponding to the most granular data available that is associated with the entire time period of the request.

In examples in which the request identifies a ranking (e.g., top ten URLs in the exemplary request discussed earlier), the primary blade 26(1) can query the databases 44(1)-44(n) to retrieve data of the identified type and corresponding to a sequentially higher ranking than the ranking identified by the request (e.g., top twenty in this example). By enlarging the scope of the queries, the accuracy of the response to the request for a ranking can be increased. For example, a list of the top ten URLs accessed by the client computing devices 14(1)-14(n) may be different for each blade 26(1)-26(n), but the eleventh most-visited URL may be the same for each blade 26(1)-26(n). Accordingly, the number of overall visits by client computing devices 14(1)-14(n) to the eleventh most-visited URL, according to each database 44(1)-44(n) of each blade 26(1)-26(n), may qualify as being in the top ten URLs accessed by the client computing devices 14(1)-14(n) in this example.

However, the eleventh most-visited URL would not be returned in response to queries to each of the databases 44(1)-44(n) for the top ten most-visited URLs only. By enlarging the scope of the queries and requesting the top twenty most-visited URLs from each database 44(1)-44(n), for example, the eleventh most-visited URL can be included in a response to the request in this example. While in this example the ranking size is doubled, any size factor can be used in order to increase the accuracy of the response.

In step 308, the primary blade 26(1) of the multi-blade network traffic management apparatus 12 implementing the associated AVR module 42(1) consolidates the statistical data retrieved in step 306 to generate a response to the request obtained in step 302. In order to consolidate the statistical data obtained in response to each of the queries sent in step 306, the primary blade 26(1) implementing the associated AVR module 42(1) optionally generates a temporary table in the database 44(1) associated with the primary blade 26(1), thereby advantageously reusing the database 44(1) of the primary blade 26(1) to respond to the request.

In this example, the temporary table is populated by the primary blade 26(1) implementing the associated AVR module 42(1) with all of the data returned from each of the queries to the databases 44(1)-44(n). The primary blade 26(1) implementing the associated AVR module 42(1) then performs one or more operations on the temporary table to generate a consolidated response to the request received in step 304. Referring to the example described earlier, the primary blade 26(1) implementing the associated AVR module 42(1) can consolidate the number of visits by client computing devices 14(1)-14(n) for overlapping URLs to reduce the data. Then, the primary blade 26(1) implementing the associated AVR module 42(1) can rank the number of visits to identify the top ten most-visited URLs across all of the blades 26(1) of the multi-blade network traffic management apparatus 12.

In step 310, the primary blade 26(1) of the multi-blade network traffic management apparatus 12 implementing the AVR module 42(1) outputs the response generated in step 310. In one example, the response generated in step 308 is provided to a network administrator user of the administrator computing device 18 using the LAN 22. The data can be provided in any form, such as raw data or based on one or more graphical representations generated by the AVR module 42(1) of the primary blade 26(1) by way of example only. Additionally, the generated response can be output to a file stored in the memory 30(1) of the primary blade 26(1) for subsequent retrieval by the network administrator using the administrator computing device 18. Other methods of outputting the response generated in step 308 can also be used.

By this technology, a network traffic management apparatus can provide distributed application visibility and reporting across a plurality of blades of a multi-blade network traffic management apparatus in the application layer. With this technology, a multi-blade traffic management apparatus can provide statistical data regarding network traffic irrespective of the compatibility of the databases associated with AVR modules of each of the blades or whether the databases all support a database layer consolidation algorithm such as a map-reduce or a map-reduce-merge algorithm, for example. Additionally, by automatically generating queries in the application layer of a primary blade and at run-time, distributed reporting can continue to be supported relatively easily when new types of statistics are added to the AVR database of each blade.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for distributed application visibility and reporting implemented by one or more network traffic management apparatuses, the method comprising:
    obtaining statistical data corresponding to one or more entities associated with application network traffic and storing one or more subsets of the statistical data in each of a plurality of databases;
    receiving a request for statistical data that identifies one or more of the entities associated with the application network traffic and a historical time interval;
    querying the databases based on the one or more of the entities associated with the application network traffic in the historical time interval to retrieve at least a portion of the statistical data corresponding to the one or more of the entities in the historical time interval; and
    consolidating the retrieved portion of the statistical data using a temporary table in one of the databases in order to generate a response to the received request for statistical data.

2. The method as set forth in claim 1, wherein the consolidating further comprises performing one or more operations on the temporary table to reduce the portion of the statistical data in accordance with the received request for statistical data.

3. The method as set forth in claim 1, wherein the received request for statistical data identifies a ranking and the querying further comprises querying the databases to retrieve the portion of the statistical data corresponding to a sequentially higher ranking than the ranking identified by the request for statistical data.

4. The method as set forth in claim 1, wherein the querying further comprises retrieving the portion of the statistical data from a table set storing statistical data for the one or more of the entities and associated with a trailing time period comprising all of the historical time interval.

5. The method as set forth in claim 1, wherein the databases are queried further based on a plurality of different database layer consolidation algorithms.

6. The method as set forth in claim 1, wherein the statistical data is obtained in an application layer and the method further comprises obtaining the statistical data according to an analytics profile associated with application visibility and reporting data.

7. The method as set forth in claim 1, wherein the statistical data further comprises latency data, Internet Protocol (IP) associated, or Uniform Resource Locator (URL) data.

8. A non-transitory computer readable medium having stored thereon instructions for distributed application visibility and reporting comprising executable code which when executed by one or more processors, causes the one or more processors to:
    obtain statistical data corresponding to one or more computing devices associated with application network traffic and storing one or more subsets of the statistical data in each of a plurality of databases;
    receive a request for statistical data that identifies one or more of the entities associated with the application network traffic and a historical time interval;
    query the databases based on the one or more of the entities associated with the application network traffic in the historical time interval to retrieve at least a portion of the statistical data corresponding to the one or more of the entities in the historical time interval; and
    consolidate the retrieved portion of the statistical data using a temporary table in one of the databases in order to generate a response to the received request for statistical data.

9. The medium as set forth in claim 8, wherein the executable code, when executed by the one or more processors, further causes the one or more processors to perform one or more operations on the temporary table to reduce the portion of the statistical data in accordance with the received request for statistical data.

10. The medium as set forth in claim 8, wherein the received request for statistical data identifies a ranking and the executable code, when executed by the one or more processors, further causes the one or more processors to query the databases to retrieve the portion of the statistical data corresponding to a sequentially higher ranking than the ranking identified by the request for statistical data.

11. The medium as set forth in claim 8, wherein the executable code, when executed by the one or more processors, further causes the one or more processors to retrieve the portion of the statistical data from a table set storing statistical data for the one or more of the entities and associated with a trailing time period comprising all of the historical time interval.

12. The medium as set forth in claim 8, wherein the databases are queried further based on a plurality of different database layer consolidation algorithms.

13. The medium as set forth in claim 8, wherein the statistical data is obtained in an application layer and the executable code, when executed by the one or more processors, further causes the one or more processors to obtain the statistical data according to an analytics profile associated with application visibility and reporting data.

14. The medium as set forth in claim 8, wherein the statistical data further comprises latency data, Internet Protocol (IP) associated, or Uniform Resource Locator (URL) data.

15. A network traffic management apparatus comprising memory comprising programmed instructions stored thereon and one or more processors configured to be capable of executing the stored programmed instructions to:
- obtain statistical data corresponding to one or more entities associated with application network traffic and storing one or more subsets of the statistical data in each of a plurality of databases;
- receive a request for statistical data that identifies one or more of the entities associated with the application network traffic and a historical time interval;
- query the databases based on the one or more of the entities associated with the application network traffic in the historical time interval to retrieve at least a portion of the statistical data corresponding to the one or more of the entities in the historical time interval; and
- consolidate the retrieved portion of the statistical data using a temporary table in one of the databases in order to generate a response to the received request for statistical data.

16. The apparatus as set forth in claim 15, wherein the one or more processors are further configured to be capable of executing the stored programmed instructions to perform one or more operations on the temporary table to reduce the portion of the statistical data in accordance with the received request for statistical data.

17. The apparatus as set forth in claim 15, wherein the received request for statistical data identifies a ranking and the one or more processors are further configured to be capable of executing the stored programmed instructions to query the databases to retrieve the portion of the statistical data corresponding to a sequentially higher ranking than the ranking identified by the request for statistical data.

18. The apparatus as set forth in claim 15, wherein the one or more processors are further configured to be capable of executing the stored programmed instructions to retrieve the portion of the statistical data from a table set storing statistical data for the one or more of the entities and associated with a trailing time period comprising all of the historical time interval.

19. The apparatus as set forth in claim 15, wherein the databases are queried further based on a plurality of different database layer consolidation algorithms.

20. The apparatus as set forth in claim 15, wherein the statistical data is obtained in an application layer and the one or more processors are further configured to be capable of executing the stored programmed instructions to obtain the statistical data according to an analytics profile associated with application visibility and reporting data.

21. The apparatus as set forth in claim 15, wherein the statistical data further comprises latency data, Internet Protocol (IP) associated, or Uniform Resource Locator (URL) data.

* * * * *